UNITED STATES PATENT OFFICE.

CAMPBELL MORFIT, OF LONDON, ENGLAND.

IMPROVEMENT IN PRESERVING AND CONDENSING FRESH FOOD.

Specification forming part of Letters Patent No. 213,679, dated March 25, 1879; application filed July 16, 1878; patented in England, January 11, 1877, August 14, 1877, and November 1, 1877.

*To all whom it may concern:*

Be it known that I, CAMPBELL MORFIT, technological chemist, of Baltimore, Maryland, United States of America, but now living in London, England, have invented a certain method of preserving fresh edible vegetal and animal substances in the form of condensed ready-food rations, and of which the following is a specification:

The product of my invention does not represent merely the juice or extract of the fruit, vegetable, and meat, but contains the latter in their natural entirety, save as to a part of their constitutional water, which is eliminated by very judicious means.

The preservative and condensing agents employed by me are animal gelatine and biscuit meal. To cheapen the cost of the product, a portion of the gelatine can be replaced by Irish moss, but the result is not so perfect.

In applying the gelatine I do not coat the exterior of lumps of meat with a solution of it, for such treatment leaves the substance unprotected against the destructive action of the interior moisture, nor yet fill with a cap or stratum of gelatine the tins in which the substances to be preserved are packed, as has been done by others heretofore; but I dissolve and diffuse the gelatine throughout the entire mass of the substance under treatment, so that every particle of the latter is intimately permeated by it. Thus I can manage equally well all kinds of articles, whatever their consistence, and whether they be fluid, solid, or semi-solid, raw or cooked. Moreover, the gelatine, in drying, enables most of the water of constitution of the fruit, vegetable, meat, or other substance under treatment to pass off at a temperature so near that of the atmosphere as to preserve it in its fresh normal state otherwise, notwithstanding it is thus condensed at the same time greatly in volume. When biscuit-powder is also employed it hastens these effects by largely extending the surfaces of the mass for evaporation, and assists materially the preservative and condensing agency of the gelatine or mixture of gelatine and Irish moss. As the gelatine dries it forms a protecting coating upon and throughout every particle of the substance treated, to render it proof against the disturbing tendency of climatic changes, more particularly as, unlike provisions preserved in tins or coated, my products are free from any internal moisture that will incite fermentation or decay.

No heat or indeed any temperature is used in any stage of the process which might impair the normality or natural condition of the substance under treatment, save as to the elimination of the greater part of its water of constitution.

I carry my invention into effect in the following manner:

First, I make a jellified stock of the fresh substance to be treated. This is done in the case of fruits by selecting those which are ripe, sound, and rather acid preferably, peeling or skinning them when expedient, cooking them or not, as may seem best, and reducing them by suitable mechanical means to a fine smooth pulp. This pulp is then mixed with gelatine dissolved in the natural juice of the fruit under treatment when the latter is succulent enough for the purpose. The whole, being heated and stirred to promote an intimate blending of the mass, is then ladled into cooling-vessels and left to set as jellified stock. The proportion of gelatine will depend upon the juiciness and nature otherwise of the fruit; but for red currants, as an example, about one ounce will suffice for every pound of the fresh fruit. Each pound of gelatine will require about sixteen pints of the fruit-juice for its proper solution in this connection.

In some instances the gelatine may be replaced, in part, by a dense jellified solution of Irish moss; but this admixture, while cheapening the cost of the product, will, at the same time, rather detract from the inherent excellence otherwise natural to it.

The fruits best adapted to this treatment are red and black currants, gooseberries, damsons, and the sour varieties of plums and peaches.

Vegetables must be selected fresh and sound, and, after being trimmed and washed, then cooked in their own juice, or with as little water as possible. When done thoroughly they are to be reduced to a smooth fine pulp by suitable mechanical means. This pulp is then mixed intimately by mechanical trituration, with a solution of gelatine in hot water, containing or not, according to choice, a flavoring of "Liebig's Extract of Beef," and the mass placed aside in cooling-vessels, to set as a jellified stock. The proportion of gelatine will vary with the nature of the vegetable under treatment, and must be determined by experience. But assuming that fresh tomatoes are under treatment, then about three ounces of gelatine will suffice for about four pounds of tomatoes, and this quantity of gelatine is to be dissolved in about sixteen fluid ounces of the natural juice of the tomato.

Animal flesh is to be trimmed so as to be without bone and as free from fat as possible, then cooked in its own juice, or with the minimum of water, and seasoned or not, according to choice. The whole being then reduced to fine smooth pulp by mechanical means is next to be triturated into an intimate mixture with gelatine.

Every fifteen pounds of trimmed beef, fowl, or fish will require about one pound of gelatine, and the latter must be dissolved in the gravy of the beef. The triturated mass, having set, constitutes the jellified stock for meat and campaign tablets and biscuits.

Curd or cheese is to be taken, as fresh as possible, crushed to smooth paste, and then triturated thoroughly with the solution of gelatine in a fluid state. The mixture, when it has set, forms the jellified stock for curd and cheese biscuits. About two ounces gelatine in thirty fluid ounces of water make the proper liquor for about one pound curd or cheese.

Cream or milk stock is prepared by soft-soaking about one and one-half ounce gelatine in about twenty fluid ounces water, sweetening with sugar, heating to perfect solution, and stirring in about one and one-half pound condensed cream or milk, further heating to fluidity, and pouring out to cool-set, as a jelly.

To preserve fresh milk, dissolve the gelatine directly in it instead of using water, and dry in thin sheets at a moderate temperature. Next, redissolve this dried-milk jelly in as much fresh milk as previously and dry again. If sweetening is required sugar must be added to the gelatine solution previous to cooling and drying.

Secondly, the jellified stocks prepared and specified as just explained are divided into thin tablets, dried cautiously, but thoroughly, in an airy room kept uniformly at a moderate temperature, preferably at about 100° to 120° Fahrenheit, (38° to 49° centigrade,) and sent to market in that form; but they can be given greater completeness as ready-food rations by converting them into biscuit forms. This is done by triturating the cold jellified stock with an edible farina preferably in a cooked state, such, for example, as the meal made by grinding whole wheat biscuits. When the mixture has become thoroughly homogeneous, it is to be molded by appropriate machinery into biscuit forms, which are then to be dried for market by a uniform moderate temperature. The proportion of meal will vary with the article under treatment and the form to be given to the finished product. Thus, for biscuits which are to be eaten as such, the ratio of stock to meal must not be large enough to impair the flavor and tenderness of the biscuit, yet sufficient to insure a firm cohesion of the material mass. On the other hand, for stew and soup tablets, as large a proportion of the stock as possible should be used, regardless of the subsequent tenderness of form. The object in this latter case is to make the product as rich as possible in vegetable and flesh components and give it in fact a dense structure to promote its keeping quality. The binding agent being only gelatine, the tablets, however hard, will soften and disintegrate readily when being heated with water into stews or soups.

In preparing either tablets or biscuits, the stock may be single or composed of a mixture of several, according to the judgment of the manufacturer and the public taste.

The composition of the biscuit in either one of the foregoing cases is complete as to the proportions and variety of its proximate elements for a healthful nutrition of the human body. Of the prime constituents, the farinaceous meals, in their baked state more or less antiseptic, supply gluten, starch, cellulose, and earthy phosphates. Fruits by their vegetal acid nature not only promote the palatability of the product, but render it eminently antiscorbutic. Vegetables act in like manner as fruits, add flavor, and afford the all-essential advantages of a varied diet or constant ration. Meat represents albumen, fibrine, creatine, creatinin, and all other stimulants peculiar to animal flesh, together with phosphate, potassa, and other desirable salts.

Curd or cheese, being practically a close mixture of casein and butter, converts the biscuit meal into a condensed sandwich. Milk adds not only albumen, casein, and cream, but also lactose and salts. Finally, gelatine not only supplements the whole with its own alimentary capacity, but binds the ingredients into a firm cohesion and co-operates with the biscuit-meal in condensing the whole as a dry product.

The product is designated according to its nature by a prefix signifying the protected article, or the flavoring which dominates its composition. Thus, for examples: beef-biscuit, meat, and vegetable, or complete ration and campaign biscuit, cream-biscuit, curd-biscuit, cheese-biscuit, tomato tablet or biscuit, cauliflower tablet or biscuit, rhubarb-biscuit, lime-fruit-juice jujube, lime-fruit juice cocoatinas, lime-fruit-juice licorice-tablets, &c.

For dietetic purposes—*i. e.*, in the preparation of food—Irish moss, (carrageen,) or any similar vegetable substance that sets in cooling may be regarded as the equivalent of gelatine. It may be mixed with it to reduce the cost of the product, or substituted for it with the same end in view.

I am aware that gelatine has been mixed with the jellies of commerce as an adulteration, to increase their bulk, and that it has been used as a coating for food substances, and as a cap to exclude air from packages of preserved food.

I am also aware that it has been mixed with extract of beef, and I have patented a composition consisting of condensed milk, gelatine, sugar, and borax, known as "blanc-mange stock." In these cases, neither the preparation of the food substance, its character or state, the proportion and effect of the gelatine, nor the result is the same as in the process and product I now desire to secure. I do not use gelatine as a coating, a cap, or an adulteration, nor do I use it with extracts of food substances, but with the substances themselves, in a reduced or comminuted state, and in a proportion to diminish their bulk by the elimination of their interstitial water.

When it is not intended that the preserved substance shall take the form of biscuits or farinaceous powder, the admixture of biscuit-meal or other farina may be dispensed with, while the process in other respects is unchanged.

What I claim is—

1. The process herein described for effecting the condensation and preservation of fresh vegetables, fruits, or their juices, and animal substances in convenient forms of portable food, the same consisting in causing the absorption of the water of the same by incorporating gelatine therewith, in the manner and proportions named, to form a jellified stock, and then triturating with the jelly thus formed biscuit meal or other edible farina, dividing or molding the resulting plastic compound into masses of any desired shape and size, and drying the same at a moderate temperature for use, all substantially as set forth.

2. As a new article of commerce, tablets of fruits or their juices, animal or vegetable foods, solidified by means of gelatine, or its equivalent, incorporated therein without previous evaporation by heat.

CAMPBELL MORFIT.

Witnesses:
  JOHN WISH,
    16 *Hurley Road, N. W.*
  G. H. BRAGG,
    31 *Auckland Road, S. W.*